M. BRAY.
Dies for Forming Sheet-Metal Ware.
No. 5,257. Reissued Jan. 28, 1873.
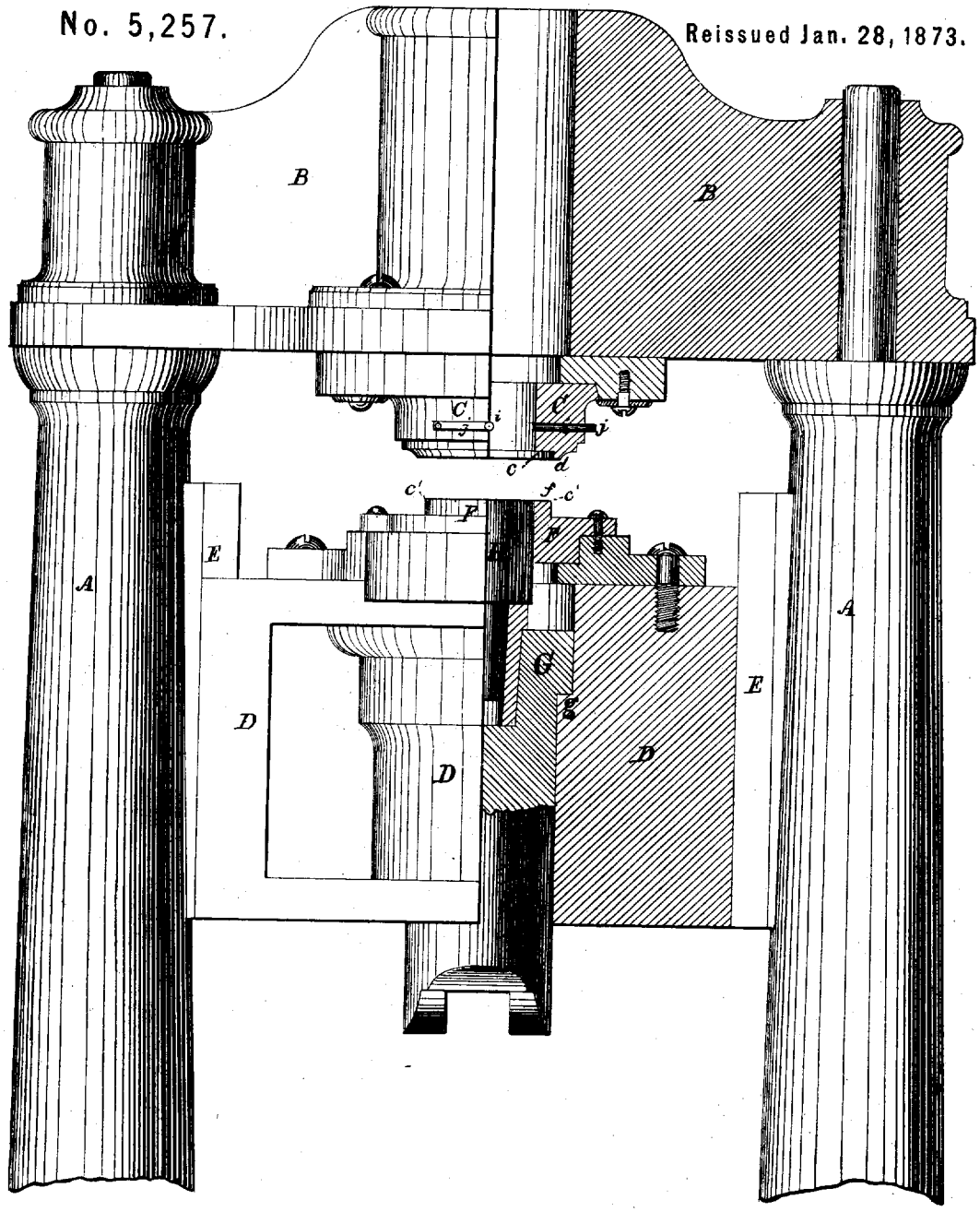
Witnesses.
W. C. Hibbard
N. C. Lombard
Inventor.
Mellen Bray
AM. PHOTO-LITHOGRAPHIC CO. N.Y. (OSBORNE'S PROCESS)

UNITED STATES PATENT OFFICE.

MELLEN BRAY, OF NEWTON, MASSACHUSETTS.

IMPROVEMENT IN DIES FOR FORMING SHEET-METAL WARE.

Specification forming part of Letters Patent No. 133,919, dated December 17, 1872; reissue No. 5,257, dated January 28, 1873.

*To all whom it may concern:*

Be it known that I, MELLEN BRAY, of Newton, in the county of Middlesex and State of Massachusetts, have invented certain Improvements in Machines for Forming Sheet-Metal Ware, of which the following is a specification:

This invention is an improvement in the construction of the dies in presses for forming sheet-metal ware, such as described in the Letters Patent granted to me December 12, 1865, No. 51,421; and in the Letters Patent granted to N. C. Lombard and myself May 19, 1868, No. 78,105; and more particularly relates to the construction of the dies for forming such articles as have vertical sides—such, for instance, as blacking and pill boxes—where the sides of the article have considerable depth, and are formed at a single operation from a flat piece of tin plate without sensibly changing its thickness and without wrinkling it, and consists of the combination of a cylindrical male die having the same diameter as the interior of the article to be made, and a cylindrical female die having its internal diameter equal to the exterior of the article to be made, and is open at the bottom and cylindrical throughout, and flat upon its face, to form a holding-surface, and a holding-plate, which surrounds the male die, and has its face also flat, and forms the other holding-surface, between which surfaces that part of the flat blank of sheet metal which is to form the sides of the box is held by a variable gripe, as will be described, while such portion of it is formed into a cylindrical shape by the dies; and it also consists in combining, with such dies and holding-surfaces, a series of spring-catches or other equivalent means for removing the article after it is formed from the male die to enable it to be discharged from the machine. This operation, although it at first appears to be somewhat similar to the well-known operation of drawing up a tube from a plate of brass or other metal by a succession of operations with several pairs of dies of different sizes is, in fact, widely different, if we compare the two modes of operation.

In the old mode the operation is commenced with a thick blank of plate several times thicker than the sides of the tube which is to be made therefrom, and, by a series of male and female trumpet-mouthed dies, each succeeding pair being somewhat smaller in diameter than the preceding pair, a cup-formed piece is first made with very low sides and a little less in diameter than the blank, and by a succession of such operations is finally drawn into a tube in a manner analogous to that of drawing wire; but by the operation of this combination of cylindrical dies and plane-holding surfaces a flat blank of tin plate can have the parts outside of the finished diameter all drawn radially toward the center in the same plane until its perimeter is brought into the diameter of the opening through the female die, and then turned at a right angle to form the parallel sides of the cylindrical portion and still maintain sensibly the same thickness. This molecular change of position in the metal is thus produced by the united action of stretching the metal in a radial direction and upsetting it in a circumferential direction, while it is confined in the same plane between the holding-surfaces with the proper degree of compression to produce these results without either wrinkling or tearing the metal. To this operation there is nothing in the old mode that corresponds.

In the drawing is represented so much of the machine as contains the dies, part of which is in section, to show their interior construction. The rest of the machine is constructed and operates substantially in the manner shown in my aforesaid patents, Nos. 51,421 and 78,105.

A A are the columns of the machine; B, the head which carries the stationary female die C. D is the cross-head that works up and down between the guides E upon the columns A, and carries the cutting and holding die F and the plunger G, which carries the male die H. The interior of the die C and the exterior of the die H are made truly cylindrical with a difference in diameter equal to twice the thickness of the tin or other metal plate of which the boxes are to be made. The cutting and holding die F is made to fit loosely upon the male die H, which works up and down within it. The plunger G, when in its lowest position, rests upon the cross-head D at the shoulder *g*, and when in that position the top or face of the male die H is level with the top of the holding-die F, as shown, and they rise together until the sheet-metal blank is cut off and griped between the face *f* of the holding-die and the face *c* of the female die C. Outside of this surface is made the female cutting-die *d*, which co-operates with the outer angle *c'* of the holding-die F, to cut out the blank from the plate, as was described in my aforesaid patents. After the holding-die F has risen so as to gripe the blank between the holding-surfaces the plunger G rises, and with it the male die H, which carries the bottom of the box forward into the female die, and thereby draws that part of the blank which is outside of the same, and is held between the holding-surfaces *f* and *c*, radially, up to the male die, and then turns it into a vertical position to form the sides of the box. The holding-surfaces and working portions of the dies should be polished so as to allow the metal to slide over their surfaces with the least friction possible, and to avoid marking the surface of the same; and the inner angle of the female die should be slightly rounded —just enough to prevent the cutting of the metal.

By this arrangement of the forming-dies and holding-surfaces it is seen that that portion of the metal plate which forms the vertical sides of the ware is rigidly confined between two controlling surfaces in all of its parts and in all stages of the forming operation, and the article is thereby drawn so closely around the male die that it will not be drawn off by the female die alone on the withdrawal of the male die; and therefore some special device for removing the same becomes necessary. For this purpose two, or, by preference, three or more, fingers or catches, *i*, are inserted radially in the female die, as shown, and in such positions in relation to the male die that the article made will be pushed beyond the fingers when the male die is in its most advanced position. These fingers are pressed inward by springs *j*, and their inner ends are beveled, so that the article made will pass by them by forcing them back, when they will catch behind the edges of the article and prevent it from going back with the male die, in an obvious manner.

The mechanical means by which the several parts are operated are fully set forth in my aforesaid patents.

By this mode of constructing and arranging the forming and holding dies I am enabled to form boxes with cylindrical sides, of an inch or more in height, from tin plate of ordinary quality, without either materially wrinkling or tearing it, which involves the upsetting or contracting of the perimeter of the blank about six inches, and which, from a protracted series of experiments to accomplish it, I believe cannot be done except by the method, substantially herein described, of confining that part of the metal-plate in which the molecular change is taking place between two holding-surfaces, which gripe the plate with sufficient firmness to prevent wrinkling, and not so firmly as to tear the metal, and which brings the metal that is to form the sides of the box or other article up to the male die in a radial direction before it is bent to the cylindrical form to make the sides.

What I claim is—

1. The combination of a cylindrical male-forming die, a female-forming die, having a cylindrical bore and a plane-holding surface, as described, and a holding-die which surrounds the male die, and has its holding-surface parallel to the holding-surface of the female die, and is suitably held to the same so as to gripe the metal plate between them, as described, all constructed and operated substantially as described.

2. The combination, with the said male and female forming-dies and the holding-surfaces, of the spring-fingers, or their equivalent, for removing the article formed from the male die, substantially as described.

Executed January 15, 1873.

MELLEN BRAY.

Witnesses:

WM. C. HIBBARD,

N. C. LOMBARD.